US005810412A

United States Patent [19]
Hall

[11] Patent Number: 5,810,412
[45] Date of Patent: Sep. 22, 1998

[54] GUARD FOR ANIMAL TRANSPORTING VEHICLES

[75] Inventor: Roland K. Hall, Bokchito, Okla.

[73] Assignee: Sundowner Trailers, Inc., Coleman, Okla.

[21] Appl. No.: 615,987

[22] Filed: Mar. 14, 1996

[51] Int. Cl.[6] .................................. B60B 3/04; B60P 3/05
[52] U.S. Cl. ............................................. 246/24.2; 49/56
[58] Field of Search .................................. 296/24.2, 152, 296/146.16; 160/DIG. 2; 119/500, 482, 496; 280/748; 49/50, 56, 63, 67

[56] References Cited

U.S. PATENT DOCUMENTS

| | | | |
|---|---|---|---|
| 1,440,144 | 12/1922 | Harper | 49/56 |
| 1,629,541 | 5/1927 | Scholer | 49/56 X |
| 2,676,816 | 4/1954 | Kern | 296/152 X |
| 3,345,104 | 10/1967 | Ulicki | 296/24.2 |
| 3,382,611 | 5/1968 | Zandelin | 49/67 |
| 3,865,425 | 2/1975 | French | 296/24.2 |
| 4,079,548 | 3/1978 | Zaccaria | 49/67 |
| 4,653,562 | 3/1987 | Moss et al. | 160/DIG. 2 X |
| 4,663,885 | 5/1987 | Stibolt | 49/67 |
| 4,677,789 | 7/1987 | Mery | 49/56 |
| 4,771,269 | 9/1988 | Pasty et al. | 49/67 X |
| 5,289,655 | 3/1994 | Marmora et al. | 49/56 X |
| 5,513,595 | 5/1996 | Chatterton | 296/24.2 X |

*Primary Examiner*—Joseph D. Pape
*Attorney, Agent, or Firm*—Baker & Daniels

[57] ABSTRACT

An animal transporting vehicle, such as a horse trailer, includes a wall defining a window opening or aperture that extends between the exterior and interior surfaces of the wall. A guard assembly for protecting the aperture includes a guard member pivotally mounted on one side of the aperture by a hinge assembly which includes cooperating surfaces that engage a projecting portion on a lower sill of the window opening to support the guard assembly in the window opening. A weather tight door is also pivotally mounted for movement from an open position permitting ventilation through the aperture to a closed position overlying the guard assembly and providing a weather tight closure for the window opening.

11 Claims, 5 Drawing Sheets

GUARD FOR ANIMAL TRANSPORTING VEHICLES

This invention relates to a guard for animal transporting vehicles, such as horse trailers and trailers designed for transporting other large animals, and truck bodies designed for similar purposes.

Horse trailers and similar trailers equipped for transporting horses and other large animals are normally equipped with windows having an outer door that can be opened to permit ventilation through the vehicle and closed during adverse weather condition. This outer door usually pivots around a sill and lays against the exterior surface of the vehicle. In horse trailers, it is desirable to provide an inner nose guard that may be left in place if the door is open and prevents horses or other animals transported by the vehicle from extending parts of their body through the opening. However, when the vehicle is stopped it is desirable to be able to pivot the nose guard out of the way so that the opening is completely opened.

Accordingly, the present invention provides a nose guard which, when positioned within the window opening of an animal transporting vehicle such as a horse trailer, pivots around the sill of the window opening after the door of the window has been opened to an open or inactive position resting on the door and completely out of the window opening.

These and other advantages of the present invention will become apparent from the following description, with reference to the accompanying drawings, in which:

FIG. 1 of a guard assembly and door in a position in which the door and guard assembly close the window;

Figure 1:
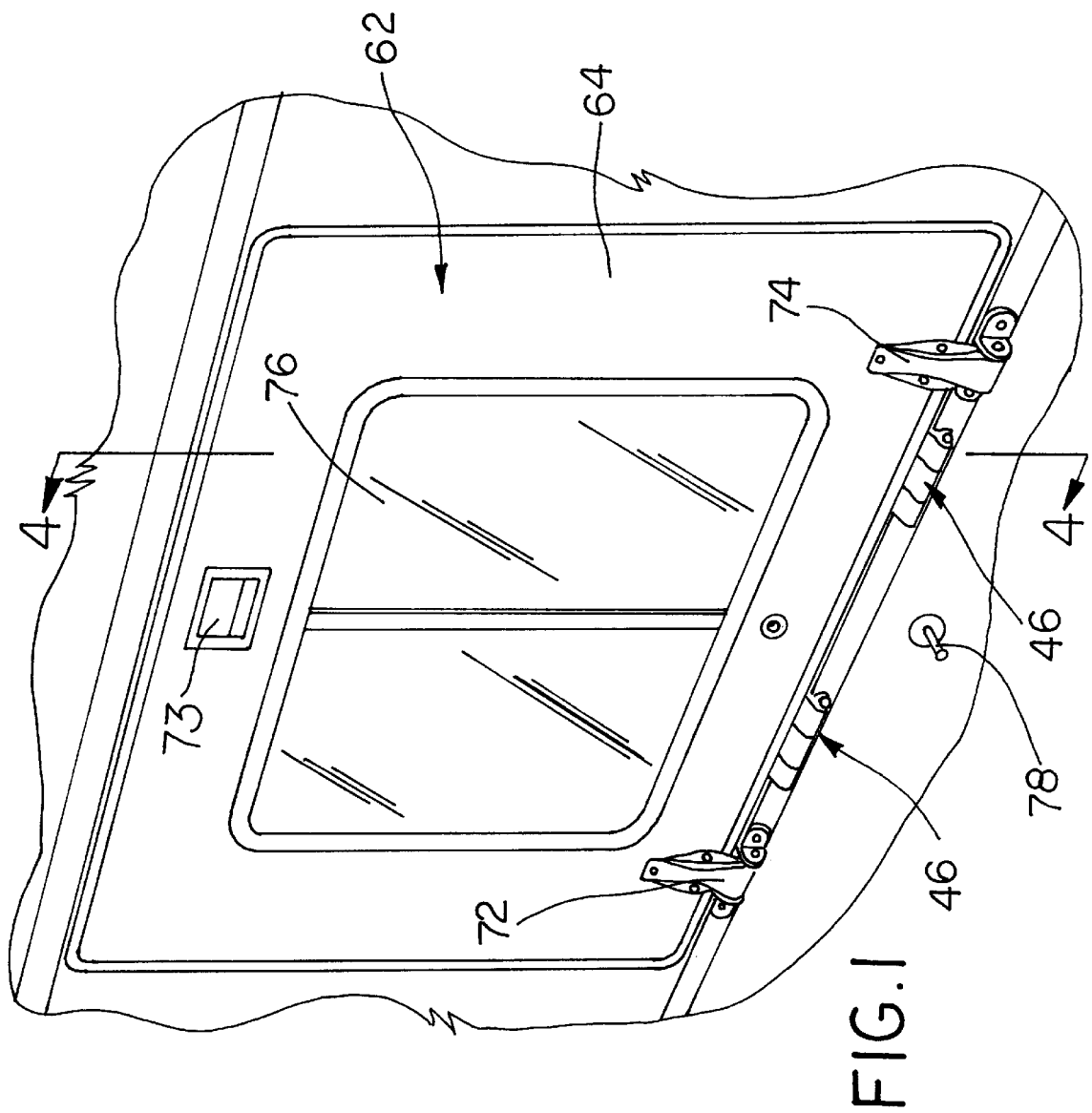

Referring now to the drawings, an animal transporting vehicle, such as a horse trailer, includes an exterior wall generally indicated by the numeral 10 which includes a window opening or aperture 12 formed therein that extends between the exterior surface 14 and the interior surface 16 of the wall 10. The interior surface 16 cooperates with similar interior surfaces of adjacent walls to define an enclosed volume for the transportation of animals. The exterior surface 14 defines the exterior of the trailer and is exposed to all of the environmental elements, such as sun, wind, rain etc. A frame generally indicated by the numeral 18 circumscribes the aperture or window opening 12 and includes a lower sill 20 extending along the bottom of the opening 12, an upper portion 22 extending along the top of the opening 12, and side portions 24 and 26 which extend along the edges thereof. Frame 18 further includes a projection 28 which extends from the portions 20, 22, 24, 26 and projects into the aperture 12.

The window opening or aperture 12 is closed by a guard assembly generally indicated by the numeral 30, which consists of a nose guard 32 having a frame 34 which supports horizontal bars 36, and a vertical bar 38 across the opening or aperture 12. A D-ring 40 slides in slot 41 formed in vertical bar 38 and is urged upwardly by a spring (not shown) enclosed within the bar 38. The D-ring 40 is connected to a catch pin 42, which engages a block 44 extending from projection 28 extending upon the upper portion 22 of the sill 18. Accordingly, catch pin 42 may be withdrawn from block 44 by moving the D-ring 40 downwardly in slot 41 when it is desirable to release the nose guard 30, as will hereinafter be explained. When the D-ring 40 is released and the nose guard 30 is in the position illustrated in FIGS. 2, the aforementioned spring causes the catch pin 42 to latch in the block 44.

Figure 2:
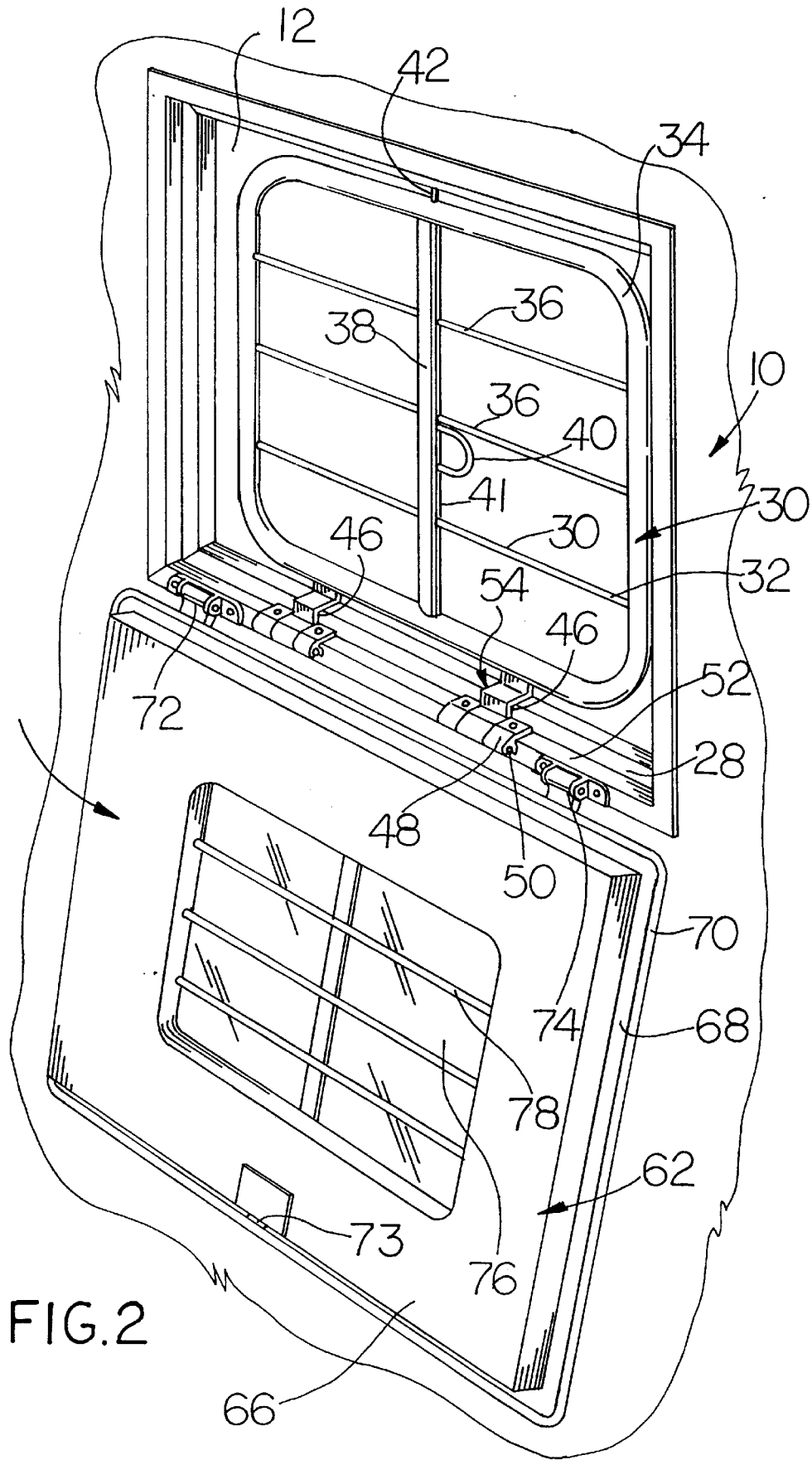
FIG. 2 is a fragmentary view similar to FIG. 1 but illustrating the guard assembly in its active position with the window or aperture and with the door open.
Figure 4:
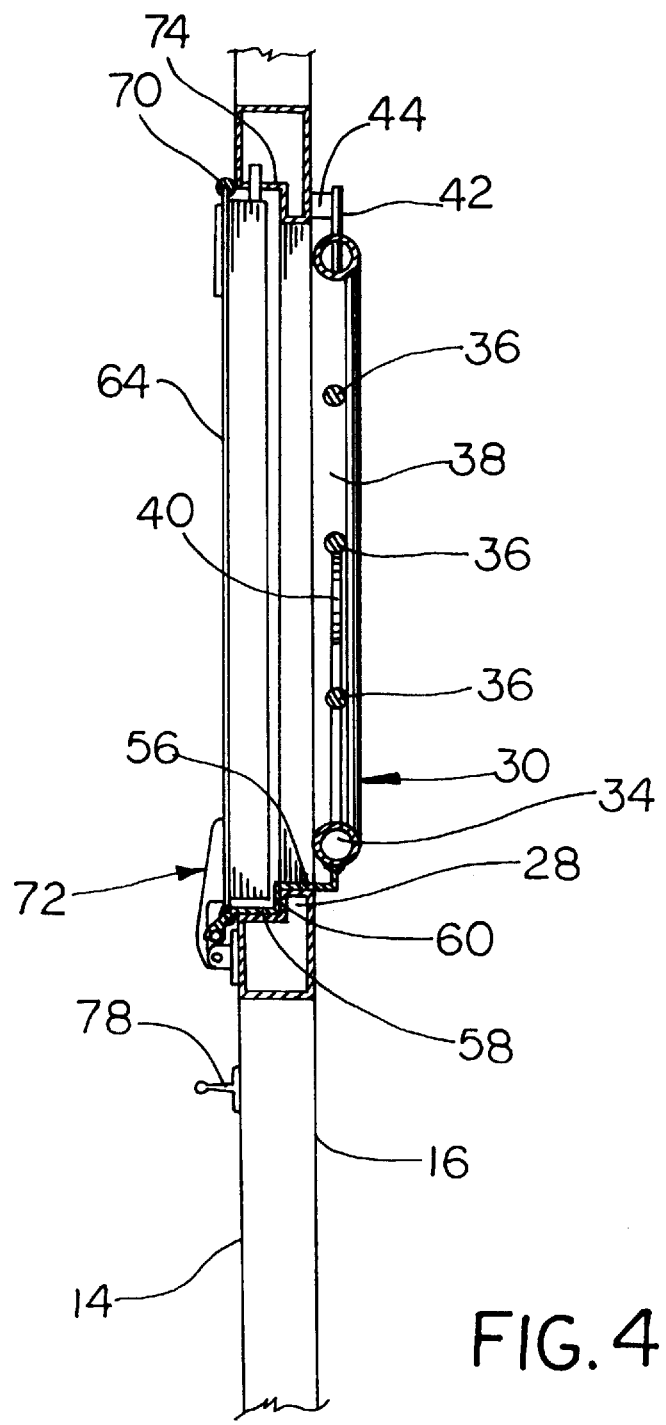
FIG. 4 is a fragmentary cross sectional view taken substantially along lines 4—4 of FIG. 1.

Guard assembly 30 further includes a pair of hinge assemblies 46 Which pivotally mount the frame 34 on the lower portion 20 of the sill 18 Each of the hinge assemblies 46 include a bifurcated hinge arm 48 secured to a surface 50 defined between projection 28 on lower portion 20 and the exterior surface 14. The hinge arms 48 support a hinge pin 50 offset from the exterior surface 14 and just below the level of the surface 52. A hinge leg 54 is secured to the frame 34 and is fastened to the bifurcated portions of the hinge arm 48 by the pin 50. The hinge leg 54 includes a dog-leg portion consisting of substantially parallel surfaces 56 and 58 interconnected by a transverse portion 60. The length of the transverse portion 60 and the length of parallel portion 58 is such that when the nose guard 30 is in the position across the aperture or window opening 12 as illustrated in FIGS. 2 and 4, the portion 58 rests upon and is supported by the surface 52 and the portion 56 rests upon and is supported by the projecting portion 28 extending along lower sill 20 of the frame 18. The portion 56 is of a length such that, when the guard assembly 30 is in the position illustrated in FIGS. 2 and 4, with the portions 58 and 56 resting upon the surface 52 and the projecting portion 28 respectively, the guard 30 will be supported within the aperture or window opening 12.

Figure 3:
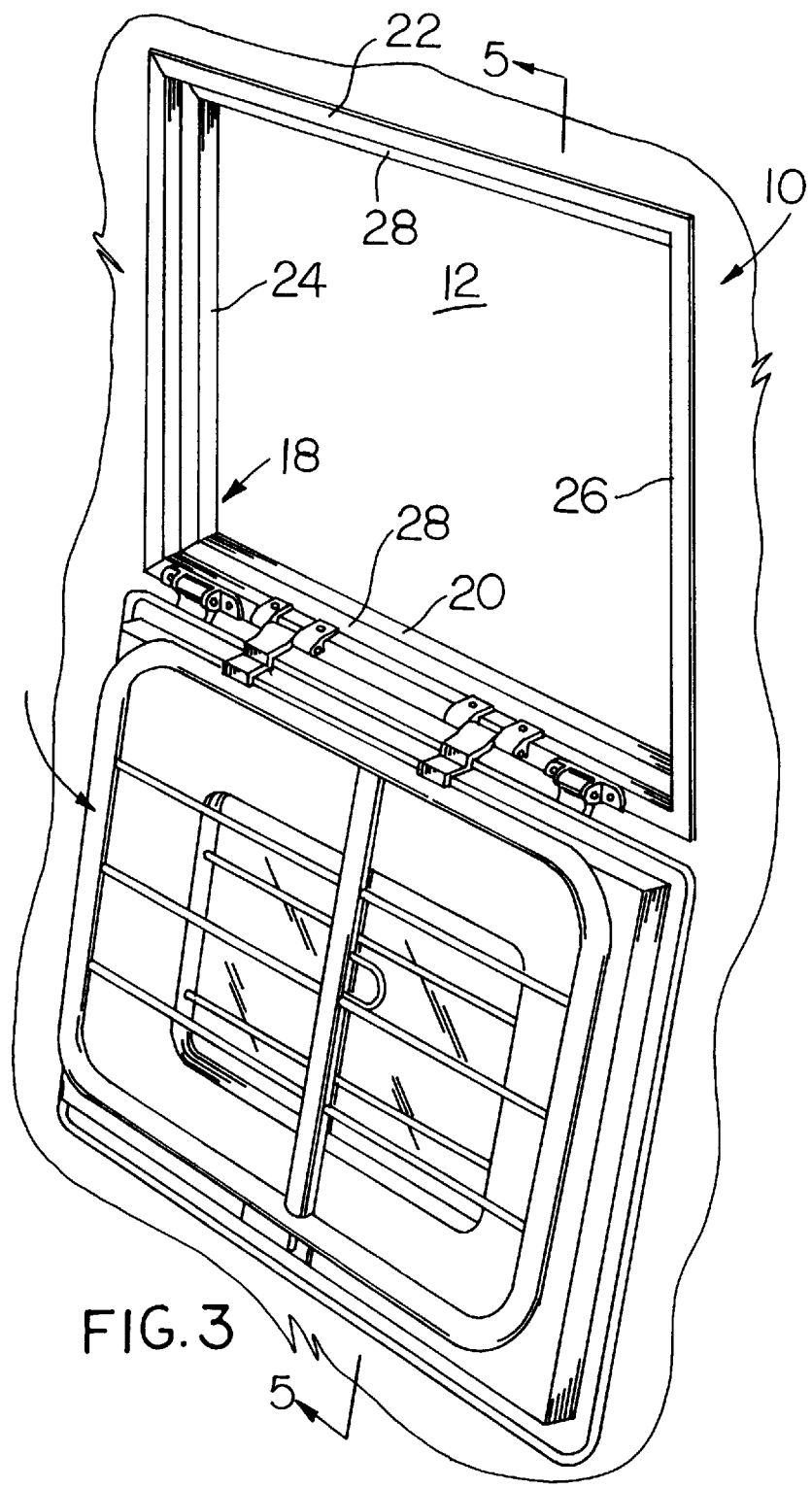
FIG. 3 is a view similar to FIG. 2 but illustrating the guard in the inactive position resting against the open door such that the window opening is completely open.
Figure 5:
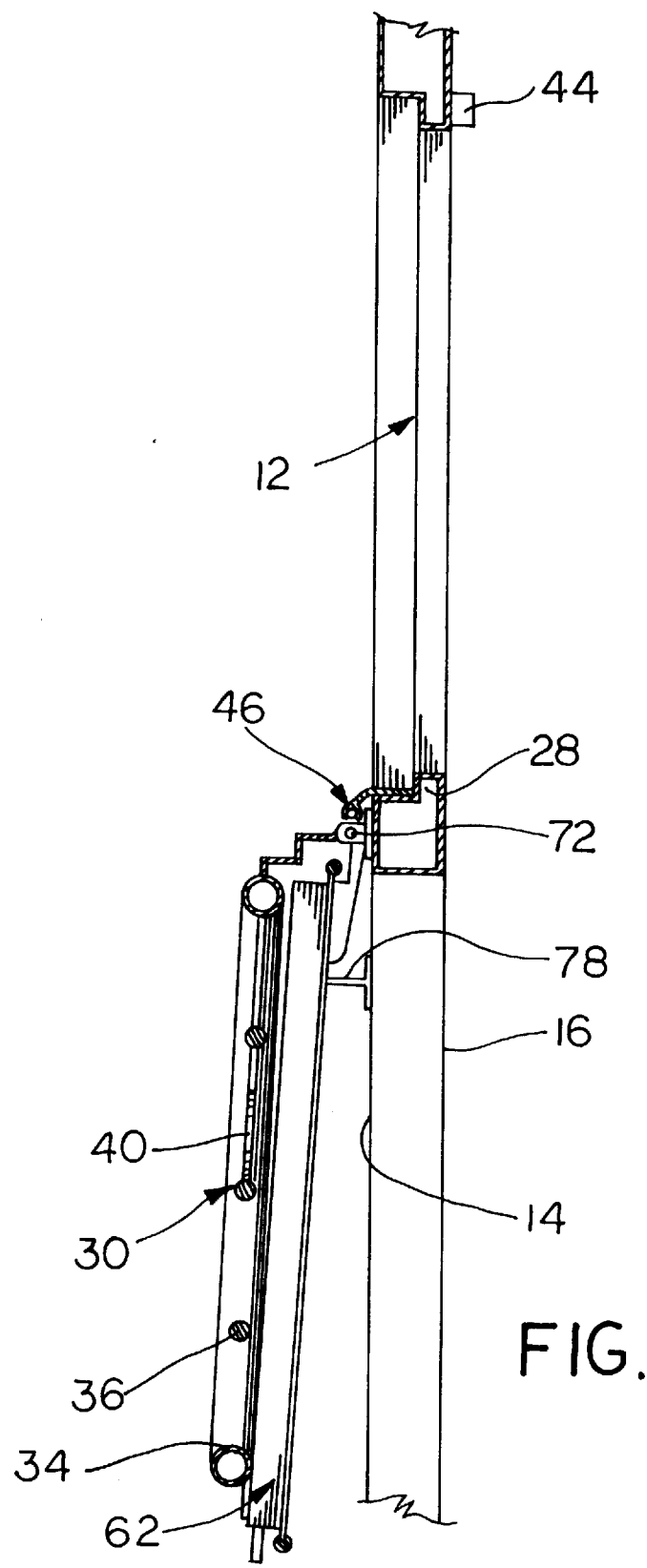
FIG. 5 is a fragmentary cross sectional view taken substantially along lines 5—5 of FIG. 3.

The aperture or window opening 12 may be completely closed and made weather tight against exterior elements by use of the door 62. The door 62 is adapted to close the opening 12 after the guard 30 has been moved into the active position across the aperture 12 as illustrated in FIGS. 2 and 4. Accordingly, the door 62 includes an exterior surface 64 a projecting portion 66 which is sized to fit within the sill 18 between the projection 28 and the outside of wall 10. The projecting portion 66 is circumscribed by a lip 68 which is somewhat larger than the opening 12. A flexible seal 70 is carried on lip 68 so that, when the door is moved to the closed position illustrated in FIGS. 1 and 4, the seal 70 engages the exterior surface 14 to provide a weather tight seal. A pair of hinge assemblies 72, 74 mount the door for movement between the open position illustrated in FIGS. 2, 3 and 5 to the closed position illustrated in FIGS. 1 and 4. A conventional catch assembly 72 is adapted to engage an opening 74 and the upper portion 22 of the sill 18 when the door is in the closed position. The door 62 includes a translucent panel 76 protected by bars 78 to permit light to enter the transport vehicle even if the door 62 is closed. It will be noted that the design of the hinge assemblies 46 is such that the guard 30 is disposed on one side of the projection 28 and the door 62 is disposed on the opposite side of the projection 28 when both the door and the guard are in their active positions illustrated in FIGS. 1 and 4. A support 78 is mounted on exterior surface 14 to support the door 62 away from the surface 14 when the door is opened. When the guard 30 is opened as illustrated in FIG. 5, the guard rests on the projecting portion 66 of the door 62 as also illustrated in FIG. 5.

I claim:

1. In an animal transporting vehicle having a wall defining an aperture extending between exterior and interior surfaces of said wall, one edge of said aperture being defined by a sill, a guard assembly for protecting said aperture from animals transported within said vehicles, said guard assembly including a guard member and hinge means pivotally mounting said guard member for movement between an active position over said aperture and an inactive position out of said aperture, said hinge and said sill including cooperating means for supporting said guard member over said aperture, said hinge means including a hinge arm secured to said exterior surface and a hinge pin pivotally connecting said hinge arm to a hinge leg fastened to the guard member to permit the guard member to pivot about said one edge of the aperture, said cooperating means including an offset on said hinge leg and support means on said sill engaging said offset on said hinge arm to thereby support the guard member over said aperture.

2. Animal transporting vehicle as claimed in claim 1, wherein said support means includes a projection projecting into said aperture from said one edge.

3. Animal transporting vehicle as claimed in claim 2, wherein a support surface is defined on said sill between said exterior surface and said projection, said hinge arm supporting said hinge off of said support surface, said hinge pin pivotally connecting said hinge leg and the hinge arm.

4. Animal transporting vehicle as claimed in claim 2, wherein said hinge leg includes a pair of substantially parallel surfaces and a transverse portion connecting the substantially parallel surfaces, one of said parallel surfaces engaging said projection, and the other of said parallel surfaces engaging the portion of the sill extending between the projection and the exterior wall when the guard member is in the active position.

5. Animal transporting vehicle as claimed in claim 4, wherein said aperture is closed by a door, and a hinge assembly mounting said door for pivotal movement between a closed position closing said aperture to an open position displaced from said aperture.

6. Animal transporting vehicle as claimed in claim 5, wherein at least a portion of said door in said closed position is disposed between the projection and the exterior surface.

7. Animal transporting vehicle as claimed in claim 6, wherein said door in said open position extends along said exterior surface, said guard member resting against said door when the guard member is in the open position.

8. Animal transporting device as claimed in claim 2, wherein said one edge is a lower edge of said aperture.

9. Animal transporting device as claimed in claim 1, wherein said guard assembly includes a door, and a hinge assembly mounting said door for pivotal movement between a closed position closing said aperture to an open position displaced from said aperture.

10. Animal transporting vehicle as claimed in claim 2, wherein at least a portion of said door in said closed position is disposed between the projection and the exterior surface.

11. Animal transporting vehicle as claimed in claim 9, wherein said door in said open position extends along said exterior surface, said guard member resting against said door when the guard member is in the open position.

\* \* \* \* \*